United States Patent [19]
MacNeil et al.
[11] 3,955,049
[45] May 4, 1976

[54] PRINTING HEAD

[75] Inventors: John H. MacNeill, Indialantic; James E. Bellinger, Melbourne, both of Fla.
[73] Assignee: Florida Data Corporation, Melbourne, Fla.

[22] Filed: Dec. 4, 1974
[21] Appl. No.: 529,544

[52] U.S. Cl. .............................. 178/30; 346/139 C; 310/8.3
[51] Int. Cl.$^2$ .................... H04L 21/00; H04R 17/00
[58] Field of Search ................. 346/139 C; 197/1 R; 235/61.11 A, 11 C; 310/8.5, 8.6, 8.3; 178/30

[56] References Cited
UNITED STATES PATENTS
2,800,551 7/1957 Crownover .......................... 310/8.6
3,839,652 10/1974 Schafft ................................ 310/8.5

Primary Examiner—Thomas A. Robinson
Attorney, Agent, or Firm—Rose & Edell

[57] ABSTRACT
A printing head provides an array of stylii and stylii drivers for forming characters in accordance with a desired matrix of dots. Each driver comprises a flat piezoelectric ceramic wafer and a levered beam having a stylus secured to one end and providing at the stylus end a multiplication of the movement of the wafer of approximately 4 to 1 to 7 to 1. The wafers and supporting structure are circular and structured to nest preferably coaxially, with each levered beam lying at a small angle relative to its adjacent beams so that the printing ends of the stylii may be constrained to lie along a straight line perpendicular to the direction of movement of the head.

20 Claims, 8 Drawing Figures

FIG. 1
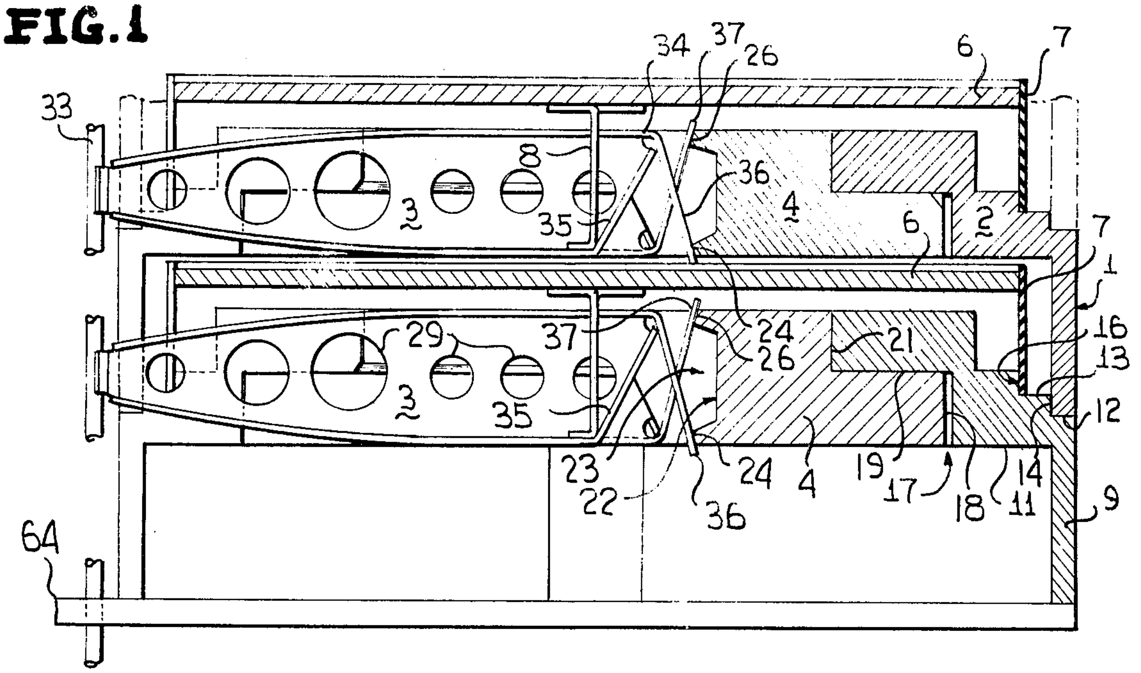
FIG. 2
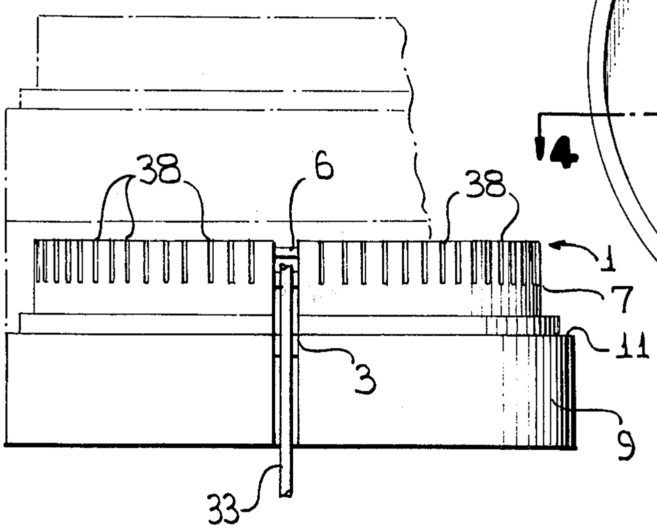
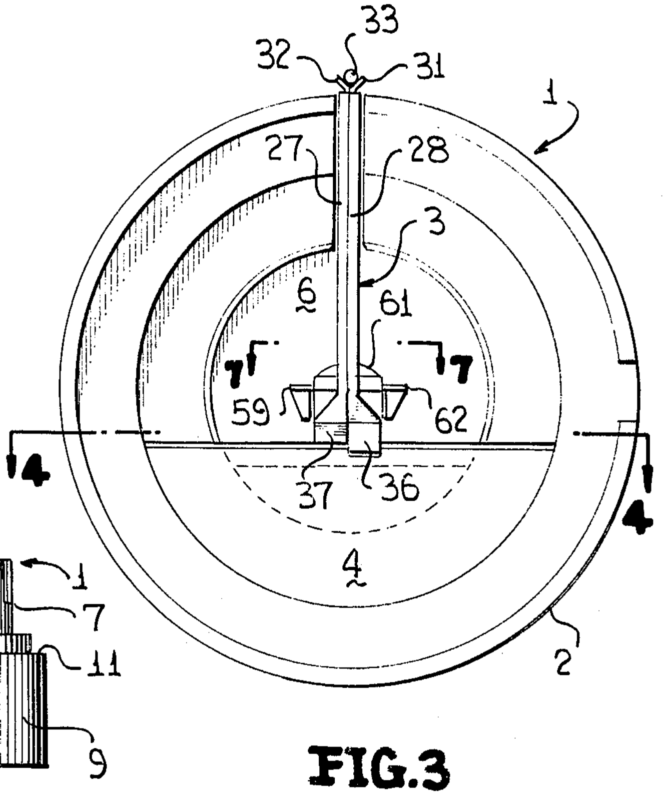
FIG. 3

FIG. 4
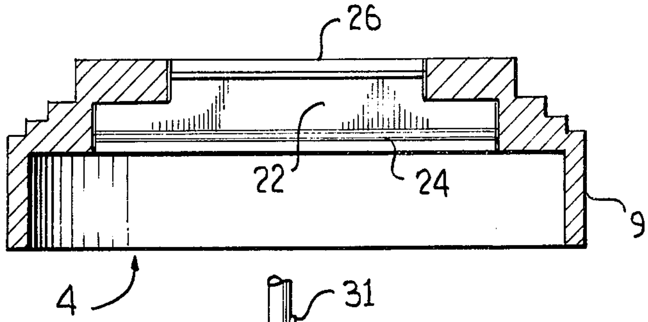
FIG. 7
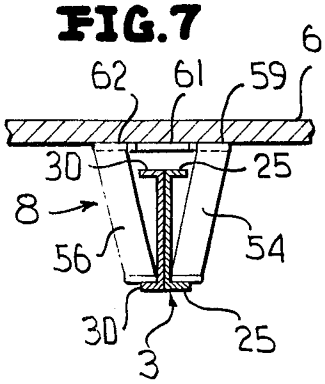
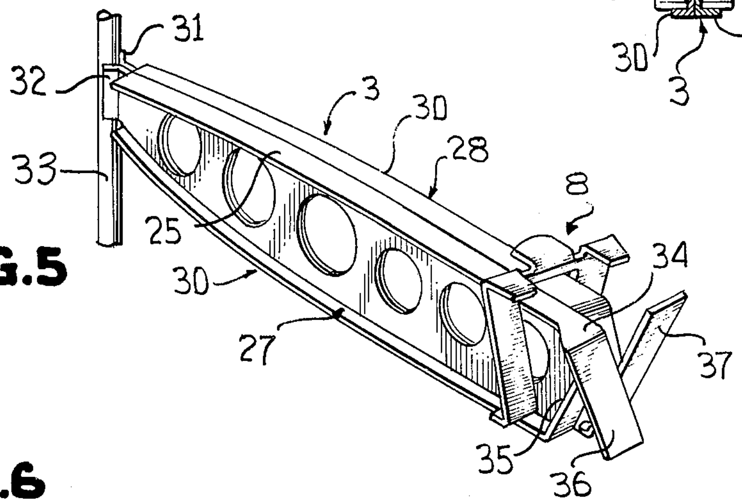
FIG. 5
FIG. 6
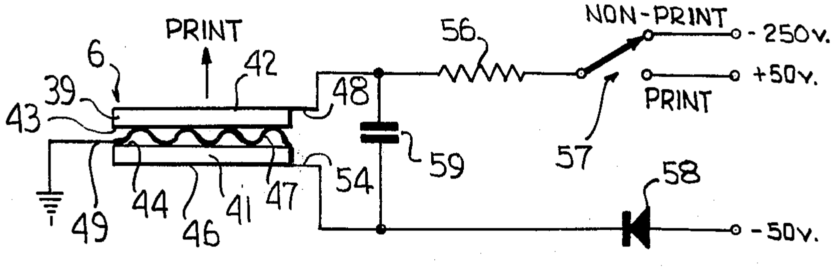
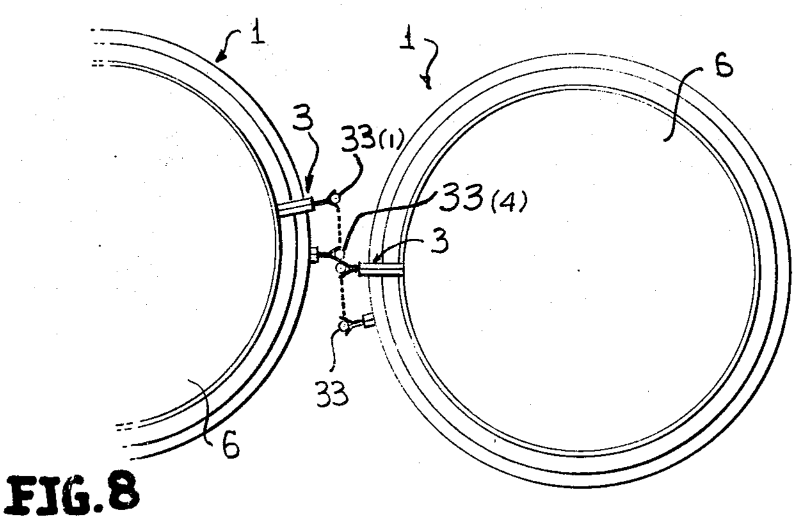
FIG. 8

PRINTING HEAD

BACKGROUND OF THE INVENTION

The present invention relates to a print head and more particularly to an array of multiple stylii drivers each of which employs a novel structural arrangement for converting movement of a piezoelectric ceramic wafer into movement of a printing stylus or needle useful in a printing operation.

The use of piezoelectric elements for driving printing elements is known in the art, as for instance in U.S. Pat. No. 3,418,427. Such prior art devices characteristically utilize the piezoelectric element as a cantilevered bending element wherein the element is restrained at one end and a stylus or print hammer is secured to the other end.

In devices of this type the piezoelectric elements must be long and the driving voltage must be quite high in order to provide sufficient flexure to produce the requisite printing stroke. The resulting structure is heavy, slow in operation and, as a result of the manner in which the piezoelectric elements must be mounted, quite large and bulky.

SUMMARY OF THE INVENTION

In accordance with the present invention, a print head is provided comprising any desired number of individual stylus driver elements, each circular in configuration so that the driver elements may be stacked coaxially to provide a compact printer head. Each driver comprises a circular piezoelectric ceramic wafer and a beam driven from the center of the wafer to impart movement to the printing stylus or needle. The beam is mounted as a lever with a 4:1 to 7:1 lever arm to reduce movement of the wafer required to provide an acceptable printing stroke approximately 15 to 20 thousandths of an inch, as well as a matching of the driven and driving masses.

The wafer may have a d.c. bias voltage applied thereto so as to bow the wafer to the maximum extent possible within the voltage tolerance of the wafer. Such bias is applied to deflect the wafer opposite to the direction required for printing. Upon application of a printing pulse, the wafer is bowed in the printing direction to the maximum extent practicable and the resulting printing stroke and energy are twice that available from an unbiased element. Assuming the wafer has a maximum voltage range of 50 to 80 volts, the bias source voltage is in such range and the printing pulse is of opposite polarity to and twice the voltage of the bias source. Preferably asymmetrical pulse sources are employed and the d.c. bias is not required.

The individual printer elements are fabricated from light weight metals and plastics and the total weight of the print head is approximately 2 ounces for a seven stylus head.

As a result of the utilization of the above concepts in a print head, print speeds in the range of 300 to 500 characters per scond are realizable, i.e., 1800 to 3000 printing strokes per second in a 5 × 7 font including spaces between characters. Further, all of the elements required in fabrication are readily available and inexpensive so that the total head may be fabricated for well under $100.

The head described in the detailed description of the invention comprises seven driver units so that printing may be in accordance with a 5 × 7 print font. It is not intended to limit the present invention to a specific number of driver units per head since it is apparent that the number of such units per head is a function of the end use for which a specific head is designed.

A hollow needle is preferably employed as a stylus to provide close spacing between the dots of the font while maintaining an acceptable pressure on the printing surface.

It is an object of the present invention to provide a light, fast and inexpensive printer head.

It is another object of the present invention to provide a stylus printer comprising a plurality of circular stylus drivers that may be stacked coaxially to provide a compact printer head.

It is still another object of the present invention to provide a mechanical advantage for driving a stylus from a piezoelectric wafer whereby the required deflection of this wafer is maintained within acceptable limits.

Another object of the present invention is the provision of a novel fulcrum mount and coupling strut for a stylus driving beam whereby undesired displacements of the beam during a printing stroke are minimized and maintenance is virtually eliminated.

Yet another object of the invention is to employ a hollow needle as a printing stylus.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a cross-sectional view in elevation of two nested beam driver elements of the present invention;

FIG. 2 is a front view in elevation of said beam driver element;

FIG. 3 is a bottom view of the element of FIG. 2;

FIG. 4 is a section view taken along section line 4—4 of FIG. 3;

FIG. 5 is an enlarged view in perspective of the stylus driving beam of the present invention with strut 8 attached;

FIG. 6 is a detailed view of the piezoelectric ceramic wafer and a schematic diagram of the drive circuits therefor;

FIG. 7 is a sectional view taken along section line 7—7 of FIG. 3;

FIG. 8 is a top view of the print head of the present invention (clamping means omitted).

DESCRIPTION OF THE PREFERRED EMBODIMENT

Referring now specifically to FIGS. 1–3 the printing head may comprise seven (only two illustrated in FIG. 1) stylii and stylii driver assemblies, the latter generally designated by the reference numeral 1. Each driver assembly includes a circular housing or base ring 2, a stylus driver arm or Ibeam 3, a beam anchor block 4, preferably of insulating material, a piezoelectric ceramic wafer 6, an insulating support ring 7 for the wafer 6 and a strut 8 connecting the wafer 6 and the beam 3.

The housing 2 comprises a hollow cylindrical skirt 9, open at its lower end, as viewed in FIGS. 1 and 2, and terminating at its other end in a transverse annular shoulder 11. The upper surface, as viewed in FIGS. 1 and 2, of the shoulder 11 is stepped to provide horizontal surfaces 12 and 13 and vertical circumferential surfaces 14 and 16. The surface 12 has a radial dimension substantially equal to the thickness of the skirt 9 and serves to receive and support the skirt 9 of the next upper housing 2 of the stack of seven drivers; the wall 14 providing lateral support for such skirt. The surfaces 13 and 16 serve to support and provide lateral stability respectively, for the ceramic wafer support ring 7.

Interiorly of the housing 2, the skirt 9 terminates in the shoulder 11 which is recessed at a location designated by reference numeral 17 to provide a circular vertical wall 18 and a horizontal radial wall 19. The wall 19 terminates in a further circular wall 21 defining a central opening in the housing 2. The walls 19 and 21 provide surfaces of location and support for the anchor block 4 as viewed in greater detail in FIG. 4.

The anchor block 4 is generally L-shaped in section, as viewed in FIG. 1, comprising upper and lower sections each constituting a segment of a circle. Each of the segments has a radius of curvature corresponding to the radius of curvature of the adjacent walls 18 and 21 of the housing 2. The block is secured in the housing by gluing to the adjacent walls 19 and 21 of the housing. The vertical surface of the anchor block constituting the chord of the segment is designated by the reference numeral 22. The surface 22 is provided with a longitudinal notch or recess 23 defining two beam anchor surfaces 24 and 26, the purpose for which is described subsequently.

As a result of the unusually high printing speeds desired to be achieved it is necessary that the beam and its support structure be optimized for minimum deflection in all axes and for vibration. To accomplish the above objectives, the beam 3 (refer specifically to FIGS. 1 and 5) consists of two identical elongated arms 27 and 28 which are identical parts and are "C-shaped" in section. Each arm is fabricated from aluminum foil, supplying sufficient shear stiffness to provide the requisite stability, and is apertured at 29 to reduce inertia. The arms 27 and 28 are secured aligned with each other to form the beam. The arms 27 and 28 taper adjacent their radially external ends to about half the maximum vertical height adjacent the center of the structure.

The external ends of the arms 27 and 28 are bent away from each other to provide walls 31 and 32 defining a notch in which a stylus or needle 33 is secured.

The upper and lower edges of the arms 27 and 28 carry stiffening flanges 25 and 30, respectively, (see FIGS. 5 and 7) formed by bending the foil from which the arms are fabricated in a plane perpendicular to the height of the arms.

Referring again to FIGS. 1 and 5, the flange 25 of arm 27 terminates remote from the part 32, in a trapezoidal-shaped tab 34 terminating in a downwardly inclined tab 36. The flange 30 of arm 27 terminates in a trapezoidal-shaped tab 35 angled upwardly and glued to the bend between the tabs 34 and 36 of the upper part of the arm to stabilize the structure. The tab 36 is secured to the surface 24 of the anchor block 4.

The flanges 25 and 30 of the arm 28 terminate in tab structures identical to those of beam 27 so that a tab 37 of arm 28 extends upwardly from the bottom of the arm and is secured to surface 26 of anchor block 4.

The flexure structures comprising members 34, 35 and 36 of the I-beam 3 provide several useful features. The tab 35 serves to prevent twist of the flexture 36 and insures uniform distribution of stress across the flexure.

The tab 35 further ties each part of the flexure to the entire beam and in conjunction with the associated flanges 25 and 30 insures uniform distribution of stresses throughout the beam. Identical support is provided for flexing tab 37.

The tabs 36 and 37 provide a flexible coupling between the beam 3 and the anchor block 4. The symmetry of the coupling arrangement; that is, the use of upwardly and downwardly extending crossed flexures, provides the equivalent of a pivot located approximately where the tabs cross. The spring rate of this flexure is negligible. During printing intervals, the tabs permit pivoting of the beam while restraining longitudinal or vertical movement thereof. Such movement of the beam could produce misalignment of the needles 33 and result in reduced motion of the needles in the desired direction.

The structure of the crossed flexures 36 and 37 illustrated in FIGS. 1, 3 etc. is not intended to be limiting and other arrangements may be employed. For instance the crossed flexures need not be integral with the beam and may be fabricated from a different material from the beam and appropriately secured thereto.

Lateral movement of the beam 3 is restrained by means of the strut 8 as will be more fully explained subsequently.

Referring now specifically to FIGS. 1 and 2, the support ring 7 for the wafer 6 is fabricated from a flexible sleeve of insulating material and is sliced axially at regular small intervals about its periphery to provide a large number of resilient fingers 38 about the upper periphery of the sleeve. The wafer 6 is secured to the inner surface of each of the fingers 38, by gluing or by other suitable means. The aforesaid means of support permits the support to tilt to accommodate cupping of the discs which tilts the periphery of the wafer.

The wafer 6 is a sandwich of two wafers. Referring to FIG. 6 of the accompanying drawings, the wafer 6 consists of flat piezoelectric ceramic discs 39 and 41. Each wafer has a conductive coating on each of its flat surfaces; coatings 42 and 43 on disc 39 and coatings 44 and 46 on disc 41. A thin conductive wave like disc 47 is disposed between the coatings 43 and 44 and the entire structure is appropriately bonded to form the unitary body of the wafer 6. Leads 48, 49 and 54 are bonded to coating 42, conductive disc 47 and coating 46, respectively.

The discs 39 and 41 are polarized so that upon a voltage of the same polarity relative to lead 49 being applied to the leads 48 and 54, one disc expands radially while the other contracts, thus dishing the assembly of discs 39 and 41.

In the mode of operation illustrated in FIG. 6, an asymmetrical drive is employed which relies on the polarizing characteristic of the wafers. The wafers are polarized in the process of fabricating for instance by a 500 volt polarizing voltage of a given polarity. Voltages of, for instance, 200 volts may be safely applied in the polarizing direction in actual use. Voltages of only about 1/10 the polarizing voltage may be applied of the opposite polarity. Thus an asymmetrical square wave pulse source may be employed to provide a high energy printing strobe to the needle 33.

In the illustration of FIG. 6, lead 48 is connected via a resistor 56 to an asymmetrical pulse source, schematically diagrammed as a switch 57 which alternately connects resistor 56 to a −250 volt source during a non-print interval and to a +50 volt source during a print interval. Lead 54 is connected via diode 58 to a −50 volt source. A capacitor 59 which is large compared with the capacity across the wafer 6 is connected between leads 48 and 54.

In operation, during the non-print interval the upper surface (as viewed in FIG. 6) of element 39 is at −250 volts and the lower surface of element 41 is at −50 volts. When the switch 57 is in the print position the upper surface of element 39 is at +50 volts and the lower surface of element 41 is at +250 volts. Thus the volts across the wafer never exceeds 200 volts while a voltage of a polarity opposite to the polarizing voltage of the elements never exceeds 50 volts; however, the voltage swing on the outer surfaces of the wafer is 300 volts. Thus maximum driving force is achieved without exceeding the allowable tolerances.

The above driving circuit is a preferred form of circuit; however, other more conventional driving circuits may be employed, such as symmetrical circuits with or without a non-print bias voltage.

As is discussed relative to FIGS. 3 and 7, the mechanical advantage of the beam lever arrangement is approximately 4:1 to 7:1. Desired movement of the needle 33 for printing purposes is 0.015 to 0.020 inch. Thus maximum required movement of the center of the wafer is about 0.002 to 0.005 inch. In the event of use of a biased wafer as described above, required movement of the wafer from its neutral or unbiased position is about 1 to 2.5 thousandths of an inch, a movement readily obtainable with available piezoelectric ceramics; such as, lead zirconatelead titanate discs of reasonable size.

Referring again specifically to FIGS. 3 and 7 the strut 8 extends from preferably the center of the wafer 6 to the beam 3 to impart movement of the wafer to the beam. The strut 8 has two upstanding arms 54 and 56 disposed on opposite sides of the beam 3 and secured to the lower flanges 30 of the I-beam structure, as viewed in FIG. 7. The end of the strut 8 secured to the wafer 6 has three tabs 59, 61 and 62 parallel to and secured to the wafer. The flange 61 is directed toward the needle 33 and the flanges 59 and 62 are oppositedly directed. As previously indicated the strut 8 prevents lateral movement of the beam 3, tieing the beam directly to the wafer 6.

In operation upon downward movement of the wafer, as viewed in FIG. 1 and 2, the strut 8 transmits such movement to the beam 3. The beam pivots about the virtual pivot existing at the crossover point of the tabs 36 and 37, and moves the needle 33 downward by a distance equal to the movement of the center of the wafer multiplied by the beam ratio.

The beam ratio is the distance from the needle to the virtual pivot divided by the distance from the strut 8 to the virtual pivot, in the present applicatiion between 4:1 to 7:1 depending upon the best mass match between the wafer, beam, and needle.

In order to form a print head, and reference is made specifically to FIGS. 1 and 8 of the accompanying drawings, the individual units are stacked one above the other with the units rotated relative to one another to the extent necessary to provide a proper array for the desired font, a 5 × 7 font in the example presented. As a result of the small spacing between the center of the needles, 0.015 inch, the distance from the needle 33 (4) at the center of the array in FIG. 8 to the needle 33 (1) is 0.045 inch. If the beam is 0.5 inch long, the projection of the needle 33(1) on the beam 3 of needle 33(4) is about 0.497 inch and thus misalignment of the aray of needles from the center to either end is slight, and since the needles 33 are somewhat flexible, they may be passed through a straight line of apertures in a die plate 64 to provide exact alignment of the needles. Such an arrangement readily permits arrays of 10 or more needles.

Large arrays may be obtained by aligning the stylii from two print heads, each head arrayed on opposite sides of the line of stylii or needles, as illustrated in dotted lines in FIG. 8. Further it may not be convenient to use a seven high stack of elements in which case two stacks of 3 and 4 elements may be employed arranged on the opposite sides of the line of stylii. Other arrays of elements are possible requiring slightly longer beams but flexibility in the choice of beam ratios permits such modifications.

The stylus 33 may be fabricated from sapphire but preferably is a hollow needle. In order to provide sharp clean data a predetermined pressure must be achieved and thus the area of the end of the needle is a function of the energy that can be developed by the wafer-beam assembly. In the present invention, the area of the needle that must be utilized is relatively small and the dots are relatively widely spaced; an undesirable feature in a dot printer.

In accordance with the present invention, such undesirable feature is overcome by using a hollow needle, such as a small diameter hypodermic needle. The diameter of such a needle is greater than a solid stylus and reduces the spacing between dots to a more desirable opening. The center hollow circle is so small as to be virtually invisible to the naked eye and the area of the needle and thus pressure applied to the printed surface is maintained at the same level as with a solid stylus.

Referring again to the structural details of the apparatus of the present invention, where bonding or gluing is indicated a non-conductive epoxy cement may be employed. In many instances non-conductive elements may be replaced with conductive members if care is taken to provide insulation between parts by means of the epoxy and porous spacing webs.

The print head desribed above including seven stylii and drivers weighs about 2 ounces and may readily be transported across a page at high speed to permit printing in the range of 300 to 500 characters per second or higher. The inertia of the head is so small that no difficulties are encountered in high speed start and stop of the head at the beginning and end of lines respectively. Further, the travel of the needle, 15 to 20 thousandths of an inch, is sufficient to permit one or more carbon copies to be made in a single printing operation. The bias voltage required, 50 to 80 volt and switched pulse voltage of 200 to 300 volts, are readily obtainable ad presents no technical or economic barriers to implementation of the apparatus.

The reference to vertical reciprocation of the stylii is not intended to be limiting but is used only for convenience of explanation. The light weight of the structure permits positioning for horizontal operation and operation in other planes.

While I have described and illustrated one specific embodiment of my invention, it will be clear that variations of the details of construction which are specifically illustrated and described may be resorted to without departing from the true spirit and scope of the invention as defined in the appended claims.

We claim:

1. A driver for a stylus, needle or the like comprising a piezoelectric element, means for constraining said element such that in response to an exciting voltage one part of said element moves with respect to other parts thereof, a bean, first means securing a first location on said beam for substantially pivotal movement only relative to an unflexed part of said element, means for connecting a second location on said beam closely adjacent said first location to said one part of said element and an elongated stylus secured to said beam at a location remote from said first and second locations for movement parallel to the elongated dimension of said stylus.

2. A driver for a stylus, needle or the like comprising a thin, flat, piezoelectric element, means for constraining said element such that in response to an exciting voltage a part of said element flexes in a direction perpendicular to the plane of said element to move a stylus between printing and non-printing positions, a beam, flexure means for securing one end of said beam for substantially pivotal movement only relative to an unflexed region of said element, means securing a location on said beam displaced from said one end thereof to the approximate center of said element, and an elongated stylus secured to an end of said beam remote from said one end thereof for movement parallel to the elongated axis of said stylus.

3. The combination according to claim 2 wherein said first means comprises crossed-flexures.

4. The combination according to claim 2 further comprising a pulse source for producing generally square voltage waves of alternate printing and spacing half cycles, means for applying said pulses to said element whereby during spacing pulse intervals said element is flexed to a non-printing position.

5. The combination according to claim 4 wherein the magnitude of the voltage pulses of said pulse source are asymmetrical and are of greater magnitude on a given surface of the piezoelectric element when the same is flexed in the direction of printing.

6. The combination according to claim 2 wherein the ratio of the distance from said end of said beam to which said stylus is secured to said location on said beam, to the distance from said one end of said beam to said location on said beam lies in the range of 4:1 to 7:1.

7. The combination according to claim 2 wherein said piezoelectric element is circular and further comprising means for restraining said element such that the center thereof flexes to the maximum extent.

8. The combination according to claim 7 comprising a support for said element, said support having a thin circular skirt slotted to provide a plurality of upstanding fingers, said element lying in a plane generally perpendicular to said fingers and scured to said fingers at the periphery of said element.

9. A printer head comprising a plurality of stylii drivers according to claim 6, means for stacking said drivers such that at least some of said piezoelectric elements are coaxial, said beams of said coaxial stylii drivers being rotated relative to each other such that said stylii lie closely adjacent one another.

10. The combination according to claim 9 wherein at least some of said drivers are arranged side by side with said beams angled toward each other to provide close spacing between said stylii.

11. The combination according to claim 9 further comprising means for aligning such stylii in a straight line.

12. The combination according to claim 2 wherein said beam includes said flexure means as an integral part thereof.

13. The combination according to claim 2 wherein said stylus consists of a thin hollow needle-like member.

14. The combination according to claim 2 wherein said beam comprises two identical members secured back-to-back, each said member being shallow C-shaped in cross section.

15. The combination according to claim 14 wherein said flexure means comprises a separate flexure each integral with a different one of such C-shaped member.

16. The combination according to claim 15 wherein each said C-shaped member includes a main side and two edge members, each said separate flexure comprising a flexible tab inclined at less than 90° toward the plane of the other edge member, said flexible member of each said C-shaped member extending in generally opposite directions from adjacent edge members located on opposite sides of said beam.

17. The combination according to claim 15 wherein each said C-shaped member includes a main side and two edge members, each said separate flexure comprising a flexible tab extending from one of said edge members adjacent one end of said C-shaped member, a further flexible tab integral with said first flexible tab and inclined at less than 90° toward the plane of the other edge member and another flexible tab extending from said other of said edge members adjacent said one end of said C-shaped member and secured to the junction of said first and further tabs.

18. The combination according to claim 16 wherein said first and flexible tab of each of said C-shaped members is secured to said fixed location.

19. In a driver for a stylus, needle or the like a substantially rigid, elongated member having a longitudinal axis;

a stylus having a longitudinal axis, said stylus secured to said elongated member adjacent one end of said elongated member such that said axes are mutually transverse and co-planar;

a support member; and means for securing the other end of said elongated member to said support member for movement substantially only in a plane including said axes, said means for securing providing for movement substantially only about a pivot transverse to said plane and comprising crossed-flexure means extending from adjacent said other end of said elongated member to said support member.

20. The combination according to claim 19 wherein said crossed-flexure means include first and second flexible members extending from adjacent opposite edges of said other end of said elongated member to said support member in crossing pattern.

* * * * *